(12) United States Patent
Goh et al.

(10) Patent No.: US 12,479,439 B2
(45) Date of Patent: Nov. 25, 2025

(54) SYSTEMS AND METHODS FOR NEURAL-EXPTANH LEARNED TIRE MODELS

(71) Applicant: Toyota Research Institute, Inc., Los Altos, CA (US)

(72) Inventors: Yan Ming Jonathan Goh, Palo Alto, CA (US); Franck Djeumou, Palo Alto, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 172 days.

(21) Appl. No.: 18/182,474

(22) Filed: Mar. 13, 2023

(65) Prior Publication Data
US 2024/0308522 A1 Sep. 19, 2024

(51) Int. Cl.
*B60W 30/18* (2012.01)
*B60W 40/101* (2012.01)
(Continued)

(52) U.S. Cl.
CPC .... *B60W 30/18172* (2013.01); *B60W 40/101* (2013.01); *G05B 13/027* (2013.01);
(Continued)

(58) Field of Classification Search
CPC .. B60W 40/12; B60W 40/13; B60W 2530/20; G01M 17/02; B60T 8/1725;
(Continued)

(56) References Cited

U.S. PATENT DOCUMENTS 6,550,320 B1 * 4/2003 Giustino .............. B60T 8/1725
73/146
7,069,135 B2 * 6/2006 Bertrand .............. B60T 8/1725
701/80

(Continued)

FOREIGN PATENT DOCUMENTS

CN 111708977 A * 9/2020 ............ B60W 40/10
CN 112784355 B 5/2021
(Continued)

OTHER PUBLICATIONS

Rahman et al. "Neural Ordinary Differential Equations for Nonlinear System Identification", arXiv:2203.00120v2 [cs.LG]. Mar. 15, 2022.
(Continued)

*Primary Examiner* — Phutthiwat Wongwian
*Assistant Examiner* — Brian R Kirby
(74) *Attorney, Agent, or Firm* — Christopher G. Darrow; Darrow Mustafa PC

(57) ABSTRACT

System, methods, and other embodiments described herein relate to tire models based on neural-ExpTanh parameterization. In one embodiment, a method includes operating a vehicle with a control framework incorporating an ExpTanh function; calculating prior slip data based on measurements obtained by the control framework; selecting a confidence parameter; using a first predictive model to determine ExpTanh parameters based upon the prior slip data, the measurements, and the confidence parameter; and inputting a slip parameter and the ExpTanh parameters into the ExpTanh function to estimate a tire force.

19 Claims, 3 Drawing Sheets

(51) Int. Cl.
  *G05B 13/02* (2006.01)
  *G05B 13/04* (2006.01)
(52) U.S. Cl.
  CPC ....... *G05B 13/048* (2013.01); *B60W 2520/10* (2013.01); *B60W 2520/14* (2013.01); *B60W 2520/20* (2013.01); *B60W 2520/28* (2013.01); *B60W 2720/26* (2013.01)
(58) Field of Classification Search
  CPC ............. B60T 2270/86; B60T 2240/03; B60T 2240/06; B60T 8/171; B60T 8/172; B60T 2210/12; B60T 2201/03; B60T 2210/30; B60T 2240/02; B60T 7/12; B60T 2240/04; B60T 8/17558; B60T 8/00; B60T 8/1708; B60T 2210/122; B60T 8/175; B60T 2230/02; B60T 2240/00; B60T 2250/04; B60T 2270/208; B60T 8/17551; B60T 8/1761; B60T 2210/10; B60T 2270/10; B60T 2270/413; B60T 2270/416; B60T 8/17552; B60T 8/17554; B60T 8/176; B60T 8/17613; B60T 8/1763; B60T 8/885; B60T 2201/06; B60T 2210/36; B60T 2220/04; B60T 2250/02; B60T 8/174; B60T 8/17616; B60T 8/17636; B60T 8/88; B60T 8/92; G06N 3/08; G06N 3/045; G06N 7/01; G06N 3/084
  USPC .............................................. 73/9, 146, 462
  See application file for complete search history.

(56) References Cited

U.S. PATENT DOCUMENTS

| | | | | |
|---|---|---|---|---|
| 7,225,072 | B2* | 5/2007 | Fangeat | B60W 30/02 303/146 |
| 7,426,431 | B2* | 9/2008 | Fangeat | B60T 8/17551 701/48 |
| 7,945,429 | B2* | 5/2011 | Miyashita | B60C 99/006 702/41 |
| 8,844,346 | B1 | 9/2014 | Singh et al. | |
| 8,886,395 | B2 | 11/2014 | Singh et al. | |
| 8,983,749 | B1* | 3/2015 | Singh | B60T 8/172 701/71 |
| 9,222,854 | B2 | 12/2015 | Singh et al. | |
| 9,340,211 | B1* | 5/2016 | Singh | B60T 8/1725 |
| 9,358,846 | B2 | 6/2016 | Singh et al. | |
| 9,428,013 | B2 | 8/2016 | Singh | |
| 9,434,409 | B2 | 9/2016 | Singh | |
| 9,442,045 | B2 | 9/2016 | Singh | |
| 9,636,955 | B2 | 5/2017 | Singh et al. | |
| 9,663,115 | B2* | 5/2017 | Singh | G01M 1/122 |
| 9,739,689 | B2 | 8/2017 | Singh | |
| 9,751,533 | B2 | 9/2017 | Singh | |
| 9,752,962 | B2* | 9/2017 | Singh | B60W 40/12 |
| 9,821,611 | B2 | 11/2017 | Singh | |
| 9,873,293 | B2 | 1/2018 | Singh et al. | |
| 9,874,496 | B2 | 1/2018 | Singh | |
| 9,995,654 | B2 | 6/2018 | Singh | |
| 10,093,321 | B1 | 10/2018 | Berntorp et al. | |
| 10,124,809 | B2 | 11/2018 | Thor et al. | |
| 10,632,978 | B2 | 4/2020 | Gustafsson et al. | |
| 11,067,431 | B2 | 7/2021 | Cyllik et al. | |
| 11,491,995 | B2* | 11/2022 | Ishigami | B60W 50/00 |
| 12,039,812 | B2* | 7/2024 | Sakakibara | B60T 8/1725 |
| 2003/0164036 | A1* | 9/2003 | Giustino | B60T 8/1725 73/146 |
| 2016/0159365 | A1* | 6/2016 | Singh | B60W 40/068 701/32.9 |
| 2020/0250899 | A1* | 8/2020 | Sakakibara | B60T 8/1725 |
| 2022/0274452 | A1* | 9/2022 | Hasegawa | B60W 40/068 |
| 2022/0402498 | A1* | 12/2022 | Jonasson | B60W 40/068 |

FOREIGN PATENT DOCUMENTS

| | | |
|---|---|---|
| CN | 111891131 B | 10/2021 |
| CN | 113978470 A | 1/2022 |
| EP | 4029745 A1 | 7/2022 |
| JP | 2022115315 A | 8/2022 |
| WO | 2021079004 A1 | 4/2021 |

OTHER PUBLICATIONS

Koch et al. "Physics-informed Machine Learning of Parameterized Fundamental Diagrams", arXiv:2208.00880v1 [cs.LG]. Aug. 1, 2022.

Quaglino et al. "SNODE: Spectral Discretization of Neural ODEs for System Identification", arXiv:1906.07038v2 [cs.NE]. Jan. 17, 2020.

Alvarez et al. "DyNODE: Neural Ordinary Differential Equations for Dynamics Modeling in Continuous Control", arXiv:2009.04278v1 [cs.LG]. Sep. 9, 2020.

Zhong et al. "Symplectic ODE-Net: Learning Hamiltonian Dynamics with Control", arXiv:1909.12077v4 [cs.LG]. Apr. 30, 2020.

Zhong et al. "A Differentiable Contact Model to Extend Lagrangian and Hamiltonian Neural Networks for Modeling Hybrid Dynamics", arXiv:2102.06794v3 [cs.RO]. Nov. 12, 2021.

Gäfvert et al. "Novel Semi Empirical Tire Models for Combined Braking and Cornering", Department of Automatic Control, Lund Institute of Technology. Apr. 2003.

Svendius, Jacob. "Tire Modeling and Friction Estimation", PhD thesis, Lund University, 2007.

Acosta et al. "Tire lateral force estimation and grip potential identification using Neural Networks, Extended Kalman Filter, and Recursive Least Squares", Neural Computing and Applications, vol. 30, pp. 3445-3465, 2017.

Guarneri et al. "A Neural-Network-Based Model for the Dynamic Simulation of the Tire/Suspension System While Traversing Road Irregularities", IEEE Transactions on Neural Networks, vol. 19, pp. 1549-1563, 2008.

Xu et al. "Tire Force Estimation in Intelligent Tires Using Machine Learning", IEEE Transactions on Intelligent Transportation Systems, vol. 23, pp. 3565-3574, 2022.

Paden et al. "A Survey of Motion Planning and Control Techniques for Self-driving Urban Vehicles", IEEE Transactions on Intelligent Vehicles, vol. 1, pp. 33-55, 2016.

Falcone et al. "Predictive Active Steering Control for Autonomous Vehicle Systems," IEEE Transactions on Control Systems Technology, vol. 15, pp. 566-580, 2007.

Kong et al. "Kinematic and dynamic vehicle models for autonomous driving control design", 2015 IEEE Intelligent Vehicles Symposium (IV), pp. 1094-1099, 2015.

Polack et al. "The kinematic bicycle model: A consistent model for planning feasible trajectories for autonomous vehicles?", 2017 IEEE Intelligent Vehicles Symposium (IV), pp. 812-818, 2017.

Goh et al. "Toward Automated Vehicle Control Beyond the Stability Limits: Drifting Along a General Path", Journal of Dynamic Systems Measurement and Control-transactions of the Asme, vol. 142, 2019.

Balachandran et al. "Human-Centric Intelligent Driving: Collaborating with the Driver to Improve Safety", Automated Road Transportation Symposium, pp. 85-109, Springer, 2023.

Subosits et al. "Impacts of Model Fidelity on Trajectory Optimization for Autonomous Vehicles in Extreme Maneuvers", IEEE Transactions on Intelligent Vehicles, vol. 6, pp. 546-558, 2021.

Chen et al. "Neural Ordinary Differential Equations", NeurIPS, 2018.

Djeumou et al. "Neural Networks with Physics-Informed Architectures and Constraints for Dynamical Systems Modeling", 4th Annual Conference on Learning for Dynamics and Control, 2022.

Djeumou et al. "Taylor-Lagrange Neural Ordinary Differential Equations: Toward Fast Training and Evaluation of Neural ODEs", IJCAI, 2022.

(56) References Cited

OTHER PUBLICATIONS

Goh et al. "Nonlinear Model Predictive Control for Highly Transient Autonomous Drifting", 15th International Symposium on Advanced Vehicle Control, 2022.
Kingma et al. "Adam: A Method For Stochastic Optimization" arXiv preprint arXiv:1412.6980, 2014.
Matuško et al. "Neural network based tire/road friction force estimation", Engineering Applications of Artificial Intelligence 21, pp. 442-456, 2008.
Hindiyeh et al. "A Controller Framework for Autonomous Drifting: Design, Stability, and Experimental Validation", Journal of Dynamic Systems Measurement and Control-transactions of the Asme, vol. 136, p. 051015, 2011.
Goh et al. "Simultaneous Stabilization and Tracking of Basic Automobile Drifting Trajectories", 2016 IEEE Intelligent Vehicles Symposium (IV), pp. 597-602, 2016.
Spielberg et al. "Neural network vehicle models for high-performance automated driving", Science Robotics, vol. 4, 2019.
Pacejka, Hans B. "Tyre and Vehicle Dynamics", Butterworth-Heinemann, second edition. p. 184-191. 2006.
Goh, Jonathan Yan Ming. "Automated Vehicle Control Beyond the Stability Limits", Stanford University, p. 17-48. 2019.

\* cited by examiner

SYSTEMS AND METHODS FOR NEURAL-EXPTANH LEARNED TIRE MODELS

CROSS-REFERENCE TO RELATED APPLICATIONS

This application claims the benefit of co-pending U.S. Non-Provisional application Ser. No. 18/182,494, filed on Mar. 13, 2023, which is herein incorporated by reference in its entirety.

TECHNICAL FIELD

The subject matter described herein relates, in general, to predictive control for a vehicle, and, more particularly, to estimating tire forces based on a neural ExpTanh learned tire model.

BACKGROUND

Maximizing tire force usage is often beneficial to safely negotiating highly dynamic situations (e.g., emergency obstacle avoidance). Yet, accurately predicting the effective force generated by the four tires on a car can be a difficult challenge. Firstly, the tire in isolation may exhibit many complex nonlinear phenomena, including force saturation, camber thrust, and nonlinear load dependence. Indeed, significant effort has gone into developing analytical and empirical models for a single tire, including the Magic Formula that is frequently used in industry. Despite its popularity, fitting the many parameters of the Magic Formula can be difficult and often requires specialized testing.

When attached to a vehicle, the complexity compounds, as every input to these models is coupled into suspension dynamics, weight transfer, and other effects. Many control approaches in the literature thus resort to using a single-track assumption, where these effects are 'lumped' into a single tire model at the front and rear axles, and empirically fit to measured vehicle data. This includes the Fiala brush model, which has been experimentally demonstrated in autonomous vehicle control scenarios at the limits of handling, including emergency obstacle avoidance, drifting, and racing. Although the simplicity aids control development, this single tire lumping often fails to accurately capture the intricate coupling created by higher-order effects.

SUMMARY

In one embodiment, example systems and methods relating to estimating tire forces using Neural-ExpTanh learned tire models is disclosed.

In one embodiment, a method for estimating tire forces using Neural-ExpTanh learned tire models is disclosed. In one embodiment, the method includes operating a vehicle with a control framework incorporating an ExpTanh function; calculating prior slip data based on measurements obtained by the control framework; selecting a confidence parameter; using a first predictive model to determine ExpTanh parameters based upon the prior slip data, the measurements, and the confidence parameter; and inputting a slip parameter and the ExpTanh parameters into the ExpTanh function to estimate a tire force.

In one embodiment, a system for estimating tire forces using Neural-ExpTanh learned tire models is disclosed. The system includes one or more processors and a memory communicably coupled to the one or more processors. The memory stores instructions that when executed by the one or more processors cause the one or more processors to operate a vehicle with a control framework incorporating an ExpTanh function; calculate prior slip data based on measurements obtained by the control framework; select a confidence parameter; use a first predictive model to determine ExpTanh parameters based upon the prior slip data, the measurements, and the confidence parameter; and input a slip parameter and the ExpTanh parameters into the ExpTanh function to estimate a tire force.

In one embodiment, a system for estimating tire forces using Neural-ExpTanh learned tire models is disclosed. The system includes one or more processors and a memory communicably coupled to the one or more processors. The memory stores instructions that when executed by the one or more processors cause the one or more processors to receive vehicle measurements; initialize a first predictive model based on ExpTanh parameters; and apply the first predictive model to the vehicle measurements to obtain a tire force estimate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with estimating tire forces using ExpTanh functions are disclosed herein. Tire forces can be represented as having convex and concave segments separated by inflection points. Accordingly, a new approach to estimating tire forces is to characterize a family of physically feasible curves using notions of convexity, concavity, and inflection points. One particular set of functions suitable to this approach are ExpTanh functions disclosed herein, which can be used to model the second-order derivative of the tire forces with respect to their corresponding slips.

In order to find the optimal ExpTanh function for estimating tire forces, one or more neural networks may be used to determine a set of optimum parameters for the neural network functions to be used with the ExpTanh function. The training of the one or more neural networks may be based on slip data as well as vehicle measurements, thereby allowing for the ExpTanh function to not only model tire performance, but also vehicle dynamics. Once the neural network functions are found, tire forces may be estimated by inputting vehicle measurements, slip data, and the neural network functions into the ExpTanh function. This approach of using a neural ExpTanh learned tire model to estimate tire forces has been found to provide better prediction accuracy over the Magic Formula and Fiala tire models, while being easy to train and evaluate. Further, a confidence parameter may be adjusted to determine how strongly a maximum available tire/road adhesion capability constraint is enforced on fitting the ExpTanh function to the data.

Figure 1:
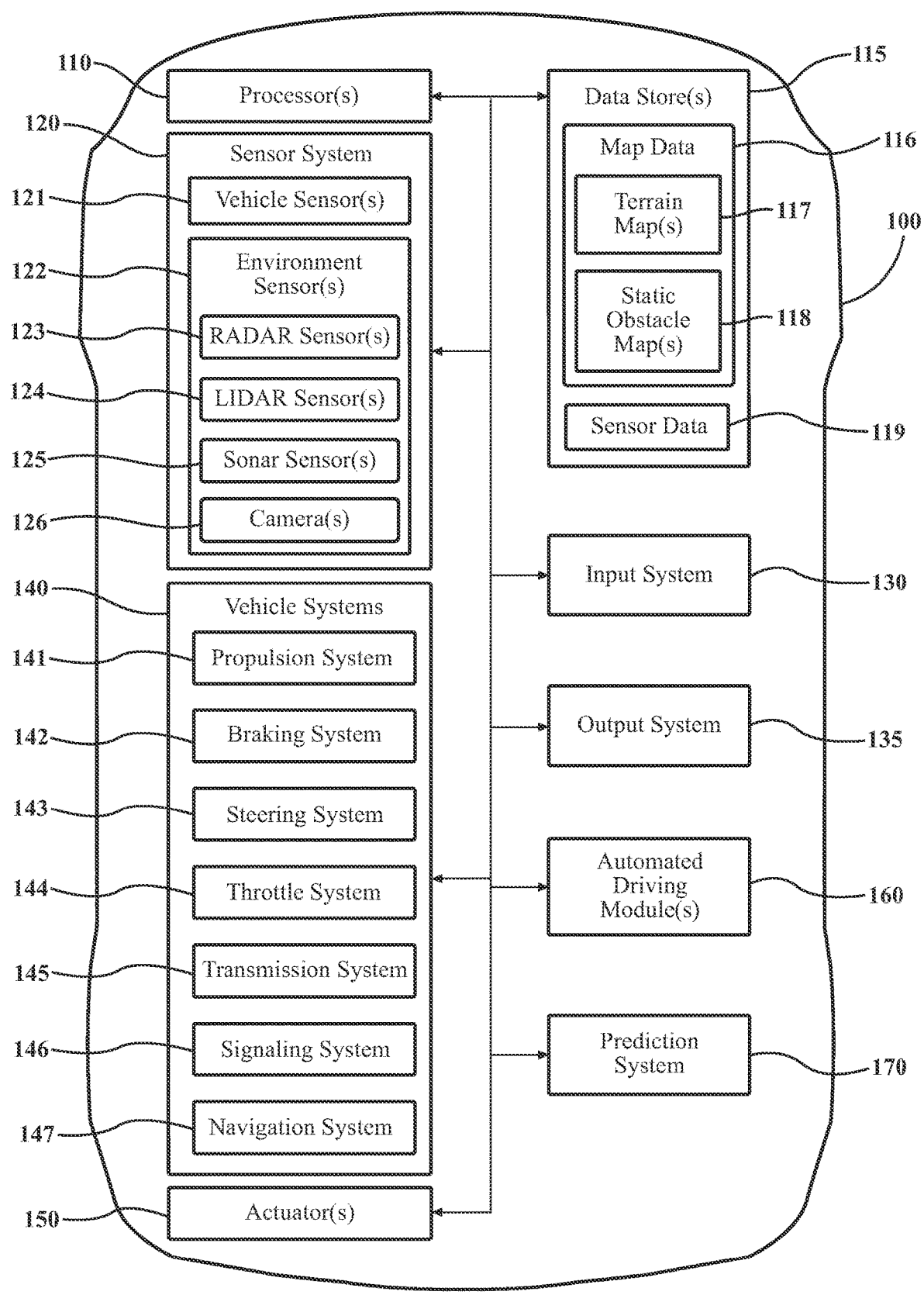
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a prediction system 170 uses road-side units (RSU), consumer electronics (CE), mobile devices, robots, drones, and so on that benefit from the functionality discussed herein associated with a tire model based on neural-ExpTanh parameterization.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-3 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to a tire model based on neural-ExpTanh parameterization.

Figure 2:
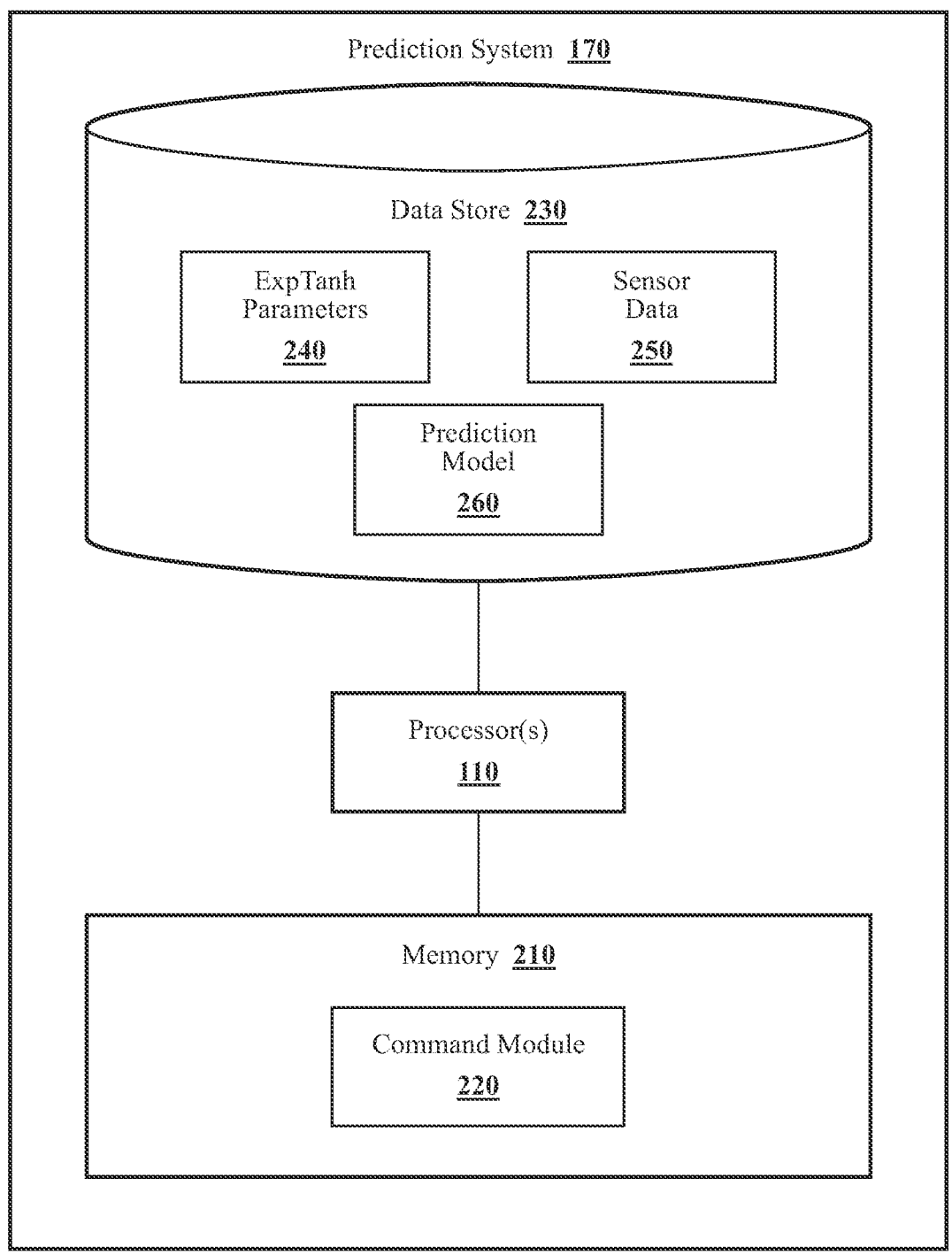
FIG. 2 illustrates one embodiment of a prediction system that is associated with estimating tire forces based on a neural ExpTanh learned tire model.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a command module 220. The memory 210 is a random-access memory (RAM), a read-only memory (ROM), a hard-disk drive, a flash memory, or other suitable memory for storing the command module 220. The command module 220 is, for example, computer-readable instructions that when executed by the processor(s) 110 cause the processor(s) 110 to perform the various functions disclosed herein.

For example, the command module 220 generally includes instructions that function to control the processor(s) 110 to implement a non-linear model predictive controller (NMPC) using ExpTanh-based tire models as described herein. Although certain examples implement an NMPC, the prediction system 170 may implement any model predictive controller (MPC).

Furthermore, the command module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the command module 220, in one embodiment, acquires the sensor data 250 that includes at least camera images. In further arrangements, the command module 220 acquires the sensor data 250 from further sensors such as radar sensors 123, LIDAR sensors 124, and other sensors as may be suitable for identifying vehicles and locations of the vehicles.

Accordingly, the command module 220, in one embodiment, controls the respective sensors to provide the data inputs in the form of the sensor data 250. Additionally, while the command module 220 is discussed as controlling the various sensors to provide the sensor data 250, in one or more embodiments, the command module 220 can employ other techniques to acquire the sensor data 250, such as data fusing, that are either active or passive. Thus, the sensor data 250, in one embodiment, represents a combination of perceptions acquired from multiple sensors.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the command module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the ExpTanh parameters 240. For example, the ExpTanh parameters 240 allow for efficient and accurate estimation of tire forces for individual tires of the vehicle 100 using ExpTanh functions. In some embodiments, command module 220 may use the ExpTanh parameters 240 to store the parameters of any predictive model discussed herein, including but not limited to initial, transitory, or optimal parameters. In one embodiment, the data store 230 further includes the prediction model 260 for storing predictive models, such as the neural networks discussed herein.

In various implementations, the command module 220 receives within sensor data 250 a set of vehicle measurements as follows:

$$\mathcal{D} = \{(\alpha_{f,r}, \sigma_{f,r}, r, V, \beta, \omega_{f,r}, \overline{F}_x, \overline{F}_y, \mu \overline{F}_z)_i\}_{i=1}^N, \quad \text{Equation (1)}$$

In Equation (1) for each value of i, $\alpha_{f,r}$ refers to the ith measurement of the slip angle of the front or rear axle, $\sigma_{f,r}$ refers to the ith measurement of the longitudinal slip ratio of the front or rear axle, r refers to the ith measurement of the yaw rate, V refers to the ith measurement of the velocity, $\beta$ refers to the ith measurement of the sideslip angle, $\omega_{f,r}$ refers to the ith measurement of the front or rear axle wheel speed, $\overline{F}_x$ and $\overline{F}_y$ refer to the ith estimated measurement of forces $\overline{F}_{xf}$, $\overline{F}_{yf}$, or $\overline{F}_{xr}$, $\overline{F}_{yr}$ (depending on the axle), and $\mu F_z$ refers to the ith measurement of the estimated maximum available tire/road adhesion capability. As used herein, $F_{xf}$, $F_{yf}$, $F_{xr}$, and $F_{yr}$ define, respectively, the front longitudinal, front lateral, read longitudinal, and rear lateral tire forces. In addition, as used herein, the maximum available tire/road adhesion capability is defined as $\mu F_z$, where $\mu$ is the friction coefficient and $F_z$ is the vertical load on the tires. Also, as used herein, $\delta$ defines the steering angle and $\tau_{f,r}$ defines the torque exerted on the front or rear axle.

The estimated measurements of $\overline{F}_x$ and $\overline{F}_y$ in Equation (1), which may be used as described below to generate ExpTanh functions, may be obtained from a variety of techniques known in the art, such as matrix inversion, Kalman filtering, receding horizon estimation, nonlinear least squares, and so on. For example, in accordance with the well-known single-track bicycle model, the equations of motion for a vehicle where the front longitudinal force $F_{xf}=0$ (e.g., a rear-wheel drive car not undergoing braking) may be defined as:

$$\dot{r} = \frac{aF_{yf}\cos(\delta) - bF_{yr}}{I_z}, \quad \text{Equation (2)}$$

$$\dot{\beta} = \frac{F_{yf}\cos(\delta - \beta) + F_{yr}\cos(\beta) - F_{xr}\sin(\beta)}{mV}, \quad \text{Equation (3)}$$

$$\dot{V} = \frac{-F_{yf}\sin(\delta - \beta) + F_{yr}\sin(\beta) + F_{xr}\cos(\beta)}{m}. \quad \text{Equation (4)}$$

In Equation (2), Equation (3), and Equation (4), $\dot{r}$ is the derivative of the yaw rate; $\dot{\beta}$ is the derivative of the sideslip angle; $\dot{V}$ is the derivative of the velocity; a, b are the distances, respectively, from the center of gravity of a vehicle to the front or rear axles of the vehicle; $F_{yf}$ is the front lateral force; $F_{yr}$ is the rear lateral force; $F_{xr}$ is the rear longitudinal force; $\delta$ is the steering angle; $\beta$ is the sideslip angle; $I_z$ is the rotational inertia; m is the mass of the vehicle; and V is the velocity. Accordingly, where inertial measurements of $\dot{r}$, $\dot{\beta}$, and $\dot{V}$ are provided (e.g., from sensor data 250), estimates of $\overline{F}_{yf}$, $\overline{F}_{xr}$, and $\overline{F}_{yr}$ where $\overline{F}_{xf}=0$ may be obtained through matrix inversion as follows:

$$\begin{bmatrix} \overline{F}_{yf} \\ \overline{F}_{xr} \\ \overline{F}_{yr} \end{bmatrix} = \begin{bmatrix} \frac{a\cos\delta}{I_z} & 0 & \frac{-b}{I_z} \\ \frac{-\sin(\delta - \beta)}{m} & \frac{\cos\beta}{m} & \frac{\sin\beta}{m} \\ \frac{\cos(\delta - \beta)}{mV} & \frac{-\sin\beta}{mV} & \frac{\cos\beta}{mV} \end{bmatrix}^{-1} \begin{bmatrix} \dot{r} \\ \dot{V} \\ \dot{\beta} \end{bmatrix}. \quad \text{Equation (5)}$$

However, this is only example of how estimates of $\overline{F}_{xf}$, $\overline{F}_{yf}$, $\overline{F}_{xr}$, or $\overline{F}_{yr}$ may be obtained and any methods well known in the art, such as those described above, for estimating such longitudinal, lateral, or total tire forces may be used.

In one approach, the command module 220 uses a tire model where the tire forces $F_{xf}$, $F_{yf}$, $F_{xr}$, and $F_{yr}$ are estimated using ExpTanh curves based on slip information. In such an embodiment, the slip angle $\alpha$, longitudinal slip ratio $\sigma$, and total slip $\kappa$ for the front or rear axle can be calculated as follows:

$$\alpha_f = \arctan\frac{V\sin\beta + ar}{V\cos\beta} - \delta, \quad \text{Equation (6)}$$

$$\alpha_r = \arctan\frac{V\sin\beta - br}{V\cos\beta}, \quad \text{Equation (7)}$$

$$\sigma_{f,r} = \frac{R\omega_{f,r} - V_{xf,xr}}{V_{xf,xr}}, \text{ and} \quad \text{Equation (8)}$$

$$\kappa_{f,r} = \sqrt{\tan\alpha_{f,r}^2 + \sigma_{f,r}^2}. \quad \text{Equation (9)}$$

In Equation (8), R is the tire radius and $V_{xf}$ and $V_{xr}$ are given by:

$$V_{xf} = V\cos(\delta - \beta) - ar\sin\delta, \quad \text{Equation (10)}$$

$$V_{xr} = V\cos\beta, \quad \text{Equation (11)}$$

where a, b are the distances from the center of gravity of vehicle 100 to the front or rear axles of vehicle 100.

ExpTanh curves are given by:

$$ExpTanh^\theta(z) = a_0^\theta + \left(a_1^\theta + a_2^\theta e^{-a_3^\theta |z|}\right)\tanh\left(a_4^\theta(z - a_5^\theta)\right), \quad \text{Equation (12)}$$

where $a_0^\theta$, $a_1^\theta$, $a_2^\theta$, $a_3^\theta$, $a_4^\theta$, and $a_5^\theta$ are constants or neural network functions. In one embodiment $a_1^\theta$, $a_2^\theta$, $a_3^\theta \geq 0$. In some embodiments, non-negative values for $a_1^\theta$, $a_2^\theta$, $a_3^\theta$ may be obtained by individually passing $a_1^\theta$, $a_2^\theta$, and $a_3^\theta$ through an exponential function prior to their use in Equation (12). As explained below, $\theta$ is a set of all parameters for the neural network(s) that compose the function.

For an ExpTanh pure slip model, where either $\sigma$ or $\alpha=0$, $F_y$ is estimated using:

$$F_y^\theta(\alpha, \text{feat}) = ExpTanh^\theta \alpha, \quad \text{Equation (13)}$$

where $F_y$ refers to $F_{yf}$ or $F_{yr}$ depending on the axle.
In Equation (13), the values of $a_0^\theta$, $a_1^\theta$, $a_2^\theta$, $a_3^\theta$, $a_4^\theta$, and $a_5^\theta$ are determined as follows:

$$\left(a_0^\theta\right)_{i=0}^5 = NN^\theta(\alpha, \text{feat}). \quad \text{Equation (14)}$$

In Equation (14), the measurements included in feat for the front axle of vehicle 100 may be defined by:

$$\text{feat} = [r, V, \beta, \mu\overline{F}_z]. \quad \text{Equation (15)}$$

Alternatively, in Equation (14), the measurements included in feat for the rear axle of vehicle 100 may be defined by:

$$\text{feat} = [r, V, \mu\overline{F}_z]. \quad \text{Equation (16)}$$

However, Equation (15) and Equation (16) are just examples of how to define feat. For example, based on the type of vehicle and available sensors, feat may be composed from a different arrangement of available vehicle measurements.

Furthermore, $NN^\theta$ denotes a predictive model, which may be a neural network or a collection of neural networks, in Equation (14), where $\theta$ is the set of all parameters for the predictive model (e.g., weights of the neural network). The optimum parameters $\theta$ are given by solving:

$$\min_\theta \frac{1}{N} \sum\nolimits_{\alpha,r,V,\beta,\overline{F}_y,\mu\overline{F}_z \in D} (F_y^\theta - \overline{F}_y)^2 + \quad \text{Equation (17)}$$
$$\lambda(\mu\overline{F}_z - |F_y^\theta(\alpha_\pm^\theta, \text{feat})|)^2,$$

where $F_y$ refers to $F_{yf}$ or $F_{yr}$ depending on the axle and $\lambda$ is a confidence parameter.

For an ExpTanh combined slip model, where neither $\sigma$ or $\alpha=0$, the total force $F_{tot}$ is estimated using:

$$F_{tot}^\theta(\kappa, \text{feat}) = ExpTanh^\theta \kappa. \quad \text{Equation (18)}$$

In Equation (18), the values of $a_0^\theta$, $a_1^\theta$, $a_2^\theta$, $a_3^\theta$, $a_4^\theta$, and $a_5^\theta$ are determined as follows:

$$(a_i^\theta)_{i=0}^5 = NN^\theta(\kappa, \text{feat}). \quad \text{Equation (19)}$$

In Equation (19), the measurements included in feat for the front axle of vehicle 100 may be defined by:

$$\text{feat} = [r, V, \beta, \mu\overline{F}_z]. \quad \text{Equation (20)}$$

Alternatively, in Equation (19), the measurements included in feat for the rear axle of vehicle 100 may be defined by:

$$\text{feat} = [r, V, \mu\overline{F}_z]. \quad \text{Equation (21)}$$

However, Equation (20) and Equation (21) are just examples of how to define feat. For example, based on the type of vehicle and available sensors, feat may be composed from a different arrangement of available vehicle measurements. Furthermore, $NN^\theta$ denotes a first predictive model, which may be a neural network or a collection of neural networks, in Equation (19), where $\theta$ is the set of all parameters for the first predictive model (e.g., weights of the neural network).

The forces $F_x^\theta$ and $F_y^\theta$ may be estimated by scaling $F_{tot}^\theta$ as follows:

$$F_y^\theta = \frac{s_i^\theta F_{tot}^\theta}{\sqrt{(s_1^\theta)^2 + (s_s^\theta)^2}}, \quad \text{Equation (22)}$$

$$F_x^\theta = \frac{s_i^\theta F_{tot}^\theta}{\sqrt{(s_1^\theta)^2 + (s_s^\theta)^2}}. \quad \text{Equation (23)}$$

In Equation (22) and Equation (23), the values of $s_1^\theta$, $s_2^\theta$ a maybe given by:

$$[s_1^\theta, s_2^\theta] = NN_2^\theta(\alpha, \sigma). \quad \text{Equation (24)}$$

$NN_2^\theta$ denotes a second predictive model, which may be a neural network or a collection of further neural networks, in Equation (24), where $\theta$ further includes the set of all parameters for the second predictive model (e.g., weights of the second neural network). The optimum parameters $\theta$ are given by solving:

$$\min_\theta \frac{1}{N} \sum\nolimits_{\alpha,\sigma,r,V,\beta,\overline{F}_y,\overline{F}_x,\mu\overline{F}_z \in D} (F_{tot}^\theta(\kappa, \text{feat}) - \overline{F}_{tot})^2 + \quad \text{Equation (25)}$$
$$(F_y^\theta - \overline{F}_y)^2 + (F_x^\theta - \overline{F}_x)^2 + \lambda(\mu\overline{F}_z - F_{tot}^\theta(\kappa_\pm^\theta, \text{feat}))^2,$$

where $F_y$ refers to $F_{yf}$ or $F_{yr}$ depending on the axle and $\lambda$ is a confidence parameter.

Figure 3:
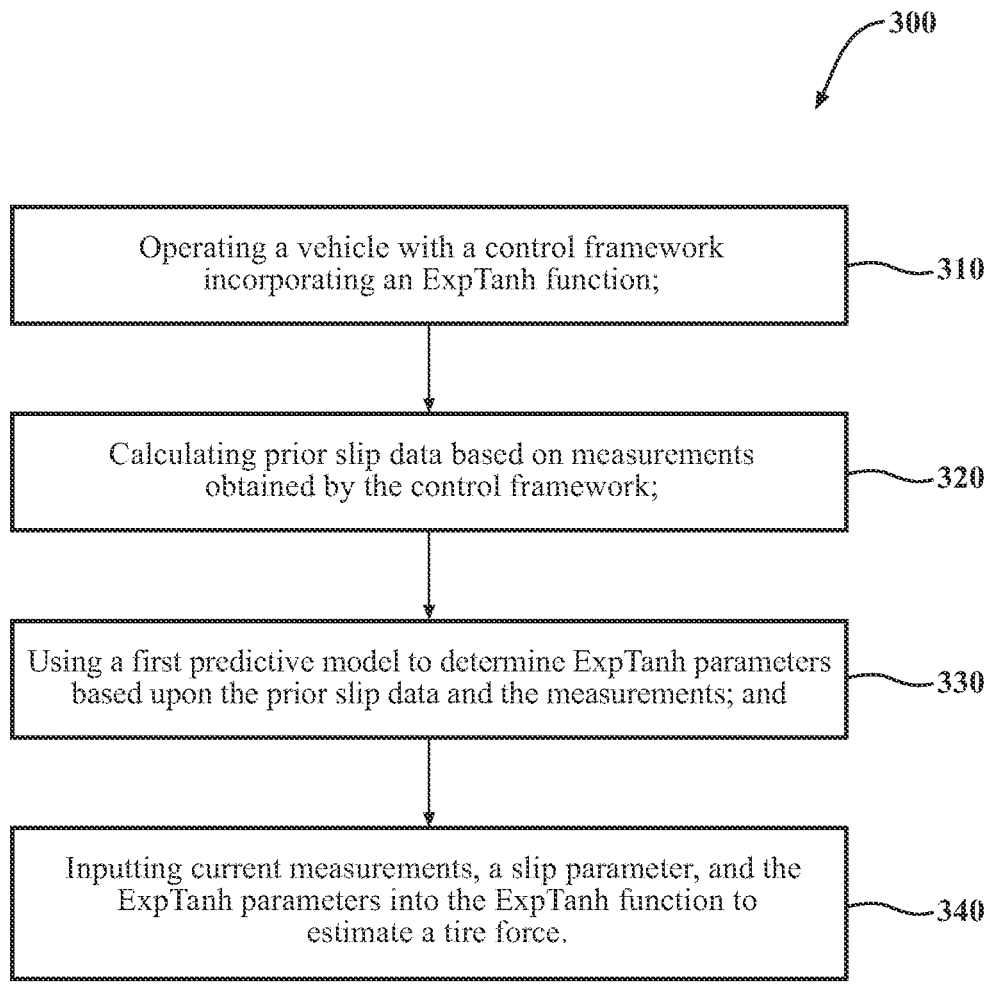
FIG. 3 illustrates one embodiment of a method that is associated with estimating tire forces based on a neural ExpTanh learned tire model.

Turning now to FIG. 3, one embodiment of a method 300 that is associated with adjusting the command module 220 for controlling the vehicle 100 with the ExpTanh learned tire model is illustrated. The method 300 will be discussed from the perspective of the prediction system 170 of FIGS. 1 and 2. While the method 300 is discussed in combination with the command module 220, it should be appreciated that the method 300 is not limited to being implemented within the command module 220 but is instead one example of a system that may implement the method 300.

At 310, the command module 220 may operate a vehicle with a control framework incorporating an ExpTanh function. For example, command module 220 may utilize a NMPC or MPC with Exp TanH tire models as described above for estimating tire forces.

In some embodiments, the control framework operated by command module 220 may receive a set of prior vehicle measurements within sensor data 250 for at least one axle, which includes the yaw rate r, the velocity V, the sideslip angle $\beta$, the axle wheel speed $\omega_{f,r}$, the estimated longitudinal force $\overline{F}_x$, the estimated lateral force $\overline{F}_y$ and the estimated maximum available tire/road adhesion capability $\mu\overline{F}_z$. In some embodiments, the prior vehicle measurements may omit some of the aforementioned measurements, contain additional measurements, or both. In one embodiment, $\mu\overline{F}_z$ is a static measurement. However, in other embodiments $\mu\overline{F}_z$ may also constitute a dynamic measurement where $\mu$, $\overline{F}_z$, or both vary over time.

At 320, command module 220 may calculate prior slip data based on measurements obtained by the control framework. For instance, based on the distances a, b from the center of gravity of vehicle 100 to the front or rear axles of vehicle 100 provided by the prediction system 170, command module 220 may calculate the prior slip angle data, the prior longitudinal slip ratio data, prior total slip data, or a combination thereof from the prior vehicle measurements. For example, with respect to the prior vehicle measurements, command module 220 may calculate the prior slip angle data depending on the axle via Equation (6) or (7), the prior longitudinal slip ratio data based on Equation (8), or the prior total slip data based on Equation (9). In some embodiments, the distances a, b are a static measurement. However, in other embodiments the distances a, b may also constitute a dynamic measurement where the distances a, b vary over time.

At 330, command module 220 may use a first predictive model to determine ExpTanh parameters based upon the prior slip data and the measurements. For example, command module 220 may utilize one or more neural networks with the prior slip data and the prior vehicle measurements as the inputs to determine the optimal coefficients $a_0^\theta$, $a_1^\theta$, $a_2^\theta$, $a_3^\theta$, $a_4^\theta$, and $a_5^\theta$ for an ExpTanh function. In some embodiments, command module 220 may also use a confidence parameter $\lambda$ as an additional input to determine the optimal coefficients $a_0^\theta$, $a_1^\theta$, $a_2^\theta$, $a_3^\theta$, $a_4^\theta$, and $a_5^\theta$ for an ExpTanh function. Where $\sigma$ or $\alpha=0$, such as for a front axle of a rear-wheel drive car not engaged in braking, command module 220 may utilize the one or more neural networks to determine the optimal coefficients $a_0^\theta$, $a_1^\theta$, $a_2^\theta$, $a_3^\theta$, $a_4^\theta$, and $a_5^\theta$ pursuant to the pure slip model described above. Where neither $\sigma$ or $\alpha=0$, such as an axle subject to braking or engine torque, the command module 220 may utilize the one or more neural networks to determine the optimal coefficients $a_0^\theta$, $a_1^\theta$, $a_2^\theta$, $a_3^\theta$, $a_4^\theta$, and $a_5^\theta$ as well as $s_1^\theta$ and $s_2^\theta$ pursuant to the combined slip model described above. It is noted for the sake of clarity that $a_0^\theta$, $a_1^\theta$, $a_2^\theta$, $a_3^\theta$, $a_4^\theta$, and $a_5^\theta$ based on the optimum parameters from within a pure slip model is likely to differ from $a_0^\theta$, $a_1^\theta$, $a_2^\theta$, $a_3^\theta$, $a_4^\theta$, and $a_5^\theta$ based on the optimum parameters from within a combined slip model. Accordingly, ExpTanh parameters 240 may be used to store a first set of $a_0^\theta$, $a_1^\theta$, $a_2^\theta$, $a_3^\theta$, $a_4^\theta$, and $a_5^\theta$ parameters for use with a pure slip model and a second set of $a_0^\theta$, $a_1^\theta$, $a_2^\theta$, $a_3^\theta$, $a_4^\theta$, and $a_5^\theta$ along with a set of $s_1^\theta$ and $s_2^\theta$ parameters for use with a combined slip model. Further, multiple sets of $a_0^\theta$, $a_1^\theta$, $a_2^\theta$, $a_3^\theta$, $a_4^\theta$, and $a_5^\theta$ or $s_1^\theta$ and $s_2^\theta$ may be further determined with respect to each axle or tire of vehicle 100 and stored in ExpTanh parameters 240.

As an example of implementing and training such neural networks, with respect to the pure slip model, one neural network having two hidden layers with three nodes per layer may be used, while for the combined slip model two neural networks having two hidden layers with three nodes per layer may be used. In such an embodiment, all the neurons may use tanh as the activation function. However, other neural networks having more or less hidden layers, more of less nodes per layer, or other activation functions may be used. In order to train one or more neural network models to find the optimal parameters $\theta$ for the one or more neural networks, an Adam optimizer may be used with a learning rate set to decay exponentially with a rate of 0.01 and an initial value of 0.001. In various embodiments, an Adam optimizer with alternative values for the learning rate or the initial value may also be used, or other optimizers known in the art may be used, such as SGD, RMSPROP, ADAGRAD, or ADADELTA.

In some embodiments, command module 220 may select a value for the confidence parameter $\lambda$, which specifies the confidence in the estimate of $\mu F_z$. As the value of confidence parameter $\lambda$ approaches zero, command module 220 may be more able to estimate peak tire forces in excess of $\mu F_z$ so as to match the data potentially better. As the value of confidence parameter $\lambda$ approaches one, command module 220 may be more constrained in estimating peak forces in excess of $\mu F_z$, thus potentially creating greater mismatch with the data. In one embodiment, $\lambda$ is a static value. However, in other embodiments $\lambda$ may also constitute a dynamic value where $\lambda$ varies over time or in relation to changes in estimates of $\mu F_z$.

In some embodiments, command module 220 may not select a value for the confidence parameter $\lambda$, in which case the optimal parameters to be obtained via Equation (17) or Equation (25) may be determined as if $\lambda$ was set to zero. For example, if a confidence parameter is not selected the component $\lambda(\mu F_z - |F_y^\theta(\alpha_\pm^\theta, \text{feat})|)^2$ may be eliminated in the optimization of Equation (17) for the pure slip model. Similarly, if a confidence parameter is not selected the component $\lambda(\mu F_z - F_{tot}^\theta(\kappa_\pm^\theta, \text{feat}))^2$ may be eliminated in the optimization of Equation (25) for the combined slip model.

At 340, command module may input current measurements, a slip parameter, and the ExpTanh parameters into the ExpTanh function to estimate a tire force. For example, command module 220 may receive current vehicle measurements stored in sensor data 250. For example, the current vehicle measurements may constitute the current yaw rate r, the current vehicle velocity V, the current side slip angle $\beta$, the steering angle $\delta$, the current front or rear axle wheel speed $\omega_{f,r}$, and the current estimate of the maximum available tire/road adhesion capability $\mu F_z$. In some embodiments, the current vehicle measurements may omit some of the aforementioned measurements, contain additional measurements, or both. In one embodiment, $\mu F_z$ is a static measurement. However, in other embodiments $\mu F_z$ may also constitute a dynamic measurement where $\mu$, $F_z$, or both vary over time.

In addition, command module 220 may calculate the current slip angle, the current longitudinal slip ratio, the current total slip, or a combination thereof based on the current vehicle measurements. For example, with respect to the current vehicle measurements, command module 220 may calculate the current slip angle (depending on the axle) via Equation (6) or (7), current longitudinal slip ratio based on Equation (8), or the current total slip based on Equation (9). In one embodiment, the distances a, b are a static measurement as described above. However, in other embodiments the distances a, b may also constitute a dynamic measurement where the distances a, b vary over time.

Moreover, command module 220 may estimate one or more tire forces using the current vehicle measurements, the current slip data, and the optimal ExpTanh parameters (e.g., the optimal coefficients $a_0^\theta$, $a_1^\theta$, $a_2^\theta$, $a_3^\theta$, $a_4^\theta$, and $a_5^\theta$ obtained at 330) to estimate a tire force pursuant to the pure slip model if the current measurements of $\sigma$ or $\alpha=0$. However, if the current measurements of $\sigma$ or $\alpha \neq 0$, then prediction system 170 may estimate one or more tire forces using the current vehicle measurements, the current slip data, and the optimal ExpTanh and scaling parameters (e.g., the optimal coefficients $a_0^\theta$, $a_1^\theta$, $a_2^\theta$, $a_3^\theta$, $a_4^\theta$, and $a_5^\theta$ and $s_1^\theta$ and $s_2^\theta$ obtained at 330) to estimate a tire force pursuant to the combined slip model. With respect to the combined slip model, once the current estimate of $F_{tot}^\theta$ is obtained it may be used to obtain current estimates of $F_y^\theta$ or $F_y^\theta$ based on $s_1^\theta$ and $s^2\theta$ as described above.

In some embodiments, estimating tires forces may only use the pure slip model or combined slip model for certain contexts. For example, a rear-wheel-drive vehicle may only use the pure slip model to estimate tires forces on the front axle while using a combined slip model to estimate tire forces on the rear axle. In other embodiments, different modes of vehicle operation may cause the vehicle to use one or more pure slip models, one or more combined models, or both. For example, the set of parameters for $a_0^\theta$, $a_1^\theta$, $a_2^\theta$, $a_3^\theta$, $a_4^\theta$, and $a_5^\theta$ (and $s_1^\theta$ and $s_2^\theta$ if using a combined slip model) may change if the vehicle switches from real-wheel-drive to all-wheel-drive, engages regenerative braking instead of mechanical braking, and so on. Accordingly, different modes of operation affecting vehicle dynamics, such as suspension adjustments, ride mode adjustments, braking adjustments, and so on may result in different sets of parameters for $a_0^\theta$, $a_1^\theta$, $a_2^\theta$, $a_3^\theta$, $a_4^\theta$, and $a_5^\theta$ as well as $s_1^\theta$ and $s_2^\theta$ (if appropriate) for each vehicle mode of operation being stored in ExpTanh parameters 240 for use with command module 220 to estimate tire forces in respect to each vehicle mode of operation.

While the above discussion has presented the estimate of tire forces from the perspective of tires sharing a common axle (i.e., front or rear), in alternative embodiments a pure or combined slip model may be used for estimating tire forces where tires do not share a common axle. For example, for an electric vehicle where one or more tires is individually connected to an electric motor, the vehicle measurements may be taken with respect to each individual tire (e.g., $\omega_{f,r}$ becomes $\omega_{1,\ldots,N}$ for N individual tires).

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above or below ground level (e.g., potholes). The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the automated driving module(s) 160 can be operatively connected to communicate with the various vehicle systems 140 and/or individual components thereof. For example, returning to FIG. 1, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising: operating a vehicle with a control framework incorporating an ExpTanh function; calculating prior slip data based on measurements obtained by the control framework; using a first Neural Network predictive model to determine ExpTanh parameters based upon the prior slip data and the measurements; and inputting a slip parameter and the ExpTanh parameters into the ExpTanh function to estimate a tire force, wherein the ExpTanh function has multiple inflection points based on the ExpTanh parameters; and adjusting a vehicle control input based on the tire force estimate.

2. The method of claim 1, wherein using the first Neural Network predictive model to determine the ExpTanh parameters is further based on scaling parameters; and the method further comprises: using, in parallel with the first Neural Network predictive model, a second Neural Network predictive model to determine the scaling parameters based on the prior slip data.

3. The method of claim 2, wherein the method further comprises: adjusting the tire force by the scaling parameters to estimate a pair of lateral and longitudinal tire forces.

4. The method of claim 3, wherein using the first or second Neural Network predictive models includes using a stochastic gradient descent algorithm to obtain the ExpTanh parameters.

5. The method of claim 4, wherein the prior slip data contains slip angle data and longitudinal slip ratio data; and the slip parameter is a current total slip.

6. The method of claim 2, further comprising selecting a confidence parameter and wherein using the first Neural Network predictive model to determine the ExpTanh parameters is further based upon the confidence parameter.

7. The method of claim 6, wherein the measurements include at least one of yaw rate data, velocity data, sideslip angle data, front axle wheel speed data, or rear axle wheel speed data.

8. The method of claim 7, wherein one or more parameters of the ExpTanh parameters is passed through a function to ensure the one or more parameters of the ExpTanh parameters have a nonnegative value.

9. A system comprising: a processor; and a memory storing instructions that, when executed by the processor, cause the processor to: operate a vehicle with a control framework incorporating an ExpTanh function; calculate prior slip data based on measurements obtained by the control framework; use a first Neural Network predictive model to determine ExpTanh parameters based upon the prior slip data and the measurements; and input a slip parameter and the ExpTanh parameters into the ExpTanh function to estimate a tire force, wherein the ExpTanh function has multiple inflection points based on the ExpTanh parameters; and adjust a vehicle control input based on the tire force estimate.

10. The system of claim 9, wherein the instruction to use the first predictive model to determine the ExpTanh parameters is further based on scaling parameters; and the system further includes instructions to: use, in parallel with the first Neural Network predictive model, a second Neural Network predictive model to determine the scaling parameters based on the prior slip data.

11. The system of claim 10, wherein the system further includes instructions to: adjust the tire force by the scaling parameters to estimate a pair of lateral and longitudinal tire forces.

12. The system of claim 11, wherein the use of the first or second Neural Network predictive models includes the use of a stochastic gradient descent algorithm to obtain the ExpTanh parameters.

13. The system of claim 12, wherein the prior slip data contains slip angle data and longitudinal slip ratio data; and the slip parameter is a current total slip.

14. The system of claim 9, wherein the system further includes the instruction to select a confidence parameter and wherein the instruction to use the first Neural Network predictive model to determine the ExpTanh parameters is further based upon the confidence parameter.

15. The system of claim 14, wherein the measurements include at least one of yaw rate data, velocity data, sideslip angle data, front axle wheel speed data, or rear axle wheel speed data.

16. The system of claim 15, wherein the system further includes instructions to pass one or more parameters of the ExpTanh parameters through a function to ensure the one or more parameters of the ExpTanh parameters have a non-negative value.

17. A non-transitory computer-readable medium including instructions that when executed by one or more processors cause the one or more processors to: operate a vehicle with a control framework incorporating an ExpTanh function; calculate prior slip data based on measurements obtained by the control framework; use a first Neural Network predictive model to determine ExpTanh parameters based upon the prior slip data and the measurements; and input a slip parameter and the ExpTanh parameters into the ExpTanh function to estimate a tire force, wherein the ExpTanh function has multiple inflection points based on the ExpTanh parameters; and adjust a vehicle control input based on the tire force estimate.

18. The non-transitory computer-readable medium of claim 17, wherein the instructions further include to apply scaling parameters to estimate a lateral tire force estimate or a longitudinal tire force estimate from the tire force estimate.

19. The non-transitory computer-readable medium of claim 18, wherein the instructions further include to adjust the vehicle control input based on the lateral tire force estimate, or the longitudinal tire force estimate.

* * * * *